(12) United States Patent
Blechschmidt et al.

(10) Patent No.: US 9,188,157 B2
(45) Date of Patent: Nov. 17, 2015

(54) AXIAL SLIDING BEARING

(71) Applicant: Geraete- und Pumpenbau GmbH Dr. Eugen Schmidt, Merbelsrod/Thueringen (DE)

(72) Inventors: Andreas Blechschmidt, Zella-Mehlis (DE); Sebastian Kirchner, Steinheid (DE)

(73) Assignee: NIDEC GPM GmbH, Auengrund Ot Merbelsrod (DE)

( * ) Notice: Subject to any disclaimer, the term of this patent is extended or adjusted under 35 U.S.C. 154(b) by 0 days.

(21) Appl. No.: 14/366,905

(22) PCT Filed: Dec. 20, 2012

(86) PCT No.: PCT/DE2012/001219
§ 371 (c)(1),
(2) Date: Jun. 19, 2014

(87) PCT Pub. No.: WO2013/091610
PCT Pub. Date: Jun. 27, 2013

(65) Prior Publication Data
US 2014/0314353 A1 Oct. 23, 2014

(30) Foreign Application Priority Data

Dec. 21, 2011 (DE) .......................... 10 2011 121 768

(51) Int. Cl.
*F16C 32/06* (2006.01)
*F16C 33/10* (2006.01)
*F16C 17/04* (2006.01)

(52) U.S. Cl.
CPC ............ *F16C 32/0659* (2013.01); *F16C 17/042* (2013.01); *F16C 33/1075* (2013.01); *F16C 2240/30* (2013.01)

(58) Field of Classification Search
CPC ........................... F16C 17/042; F16C 33/1075
USPC ......... 384/105, 303, 304, 305, 313, 368, 420, 384/123
See application file for complete search history.

(56) References Cited

U.S. PATENT DOCUMENTS 1,465,988 A * 8/1923 Kingsbury ............... 29/898.041
1,586,443 A * 5/1926 Flintermann ................. 384/125
(Continued)

FOREIGN PATENT DOCUMENTS

DE 1 065 671 B 9/1959
DE 1 208 952 B 1/1966
(Continued)

OTHER PUBLICATIONS

International Search Report of PCT/DE2012/001219, mailed Apr. 22, 2013.

*Primary Examiner* — Phillip A Johnson
(74) *Attorney, Agent, or Firm* — Collard & Roe, P.C.

(57) ABSTRACT

An axial sliding bearing has a sliding ring disposed between two planar, ring-shaped sliding surfaces pressure-stressed against one another. The axial sliding bearing is overload-proof, in particular by about 30% to 80% with regard to the average pressure stress of about 30 to 40 bar per wedge segment that is usual in the case of wedge segment bearings, and at the same time, is not susceptible to axial vibrations, and, in this connection, can be easily produced in terms of production technology, and easily installed, and furthermore does not permit the "snap-over effects" that drastically impair the lubricant wedge effect, so that even under more difficult operating conditions, targeted optimal variation of the wedge angle, adapted to the operating conditions, in each instance, is always guaranteed, and great reliability of the axial sliding bearing, at a long useful lifetime, can be guaranteed, while simultaneously expanding the optimal dynamic supporting range.

6 Claims, 3 Drawing Sheets

(56) References Cited

U.S. PATENT DOCUMENTS

| | | | |
|---|---|---|---|
| 2,796,659 A | | 6/1957 | Buske |
| 3,413,048 A | * | 11/1968 | Eudier .................. 384/303 |
| 3,495,886 A | * | 2/1970 | Roberts et al. ............ 384/420 |
| 3,635,534 A | | 1/1972 | Barnett |
| 3,784,266 A | | 1/1974 | Parlevliet |
| 4,668,106 A | | 5/1987 | Gu |
| 4,871,267 A | | 10/1989 | Gu |

FOREIGN PATENT DOCUMENTS

| | | |
|---|---|---|
| DE | 2 027 607 A1 | 2/1971 |
| DE | 1 957 058 A1 | 5/1971 |
| DE | 2 211 414 A1 | 9/1973 |
| DE | 10 2009 031 760 A1 | 1/2011 |
| GB | 1 293 665 A | 10/1972 |
| JP | 2005-155802 A | 6/2005 |

\* cited by examiner

AXIAL SLIDING BEARING

CROSS REFERENCE TO RELATED APPLICATIONS

This application is the National Stage of PCT/DE2012/001219 filed on Dec. 20, 2012, which claims priority under 35 U.S.C. §119 of German Application No. 10 2011 121 768.5 filed on Dec. 21, 2011, the disclosures of which are incorporated by reference. The international application under PCT article 21(2) was not published in English.

The invention relates to an axial sliding bearing having a sliding ring disposed between two planar, ring-shaped sliding surfaces pressure-stressed against one another.

In the case of radial sliding bearings, a wedge-shaped lubrication gap having a hydrodynamic lubrication pressure is built up on the circumference, between the cylinder mantles that slide within one another, among other things as a function of the lubrication gap, the viscosity of the lubricant, and in connection with the desired minimum speed of rotation, on which gap the shaft rotating in the sliding bearing floats and guarantees the lowest possible friction losses, at absolute freedom from wear.

In order to now generate these wedge-shaped lubrication gaps that are required for a supporting hydrodynamic lubrication pressure in the case of axial sliding bearings, as well, significantly greater effort in terms of production technology is required.

Thus, it is usual in the state of the art, on the one hand, to provide the running surface with wedge surfaces that narrow in the direction of rotation, which proceed from a lubrication groove that runs radially, in each instance, and are followed by rest surfaces for supporting the shaft in a stopped position.

These slightly inclined wedge surfaces must, however, be introduced with great production effort, by means of milling or grinding.

In order to now reduce the production effort in the production of these wedge surfaces, it was proposed in DE 1 208 952 A and also in DE 10 2009 031 760 A1 to dispose a uniformly corrugated sliding ring disk produced from spring steel, by means of plastic deformation, between the planar pressure surfaces that are stressed against one another, which disk forms a plurality of wedge angles on its bearing circumference, which angles vary as the result of elastic deformation, as a function of the axial load, in each instance, and thus the dynamic supporting force can build up between the pressure surfaces.

Because of the geometry that is greatly deformed by means of embossing in the case of these solutions proposed according to DE 1 208 952 A and DE 10 2009 031 760 A1, it becomes necessary to adapt the sheet-metal thickness to the geometry of the profile ring being aimed at, which must therefore become relatively thin.

The corrugated sliding ring disk presented in DE 1 208 952 A is disposed exclusively in floating manner between the two pressure surfaces of the axial sliding bearing, whereas the corrugated sliding ring disk proposed in DE 10 2009 031 760 A1, disposed between the two planar pressure surfaces that are stressed against one another can be disposed both in floating manner and fixed in position on one or both sides, between the pressure surfaces of the axial sliding bearing.

Because of the component-related use of thin-walled sheet metal/spring steel for the production of these corrugated sliding ring disks, a disadvantageous geometrical change in the wedge region occurs with an increasing deformation of the wedge surface region under an axial load, which change leads to loss of the wedge effect when the axial load increases further. The corrugated sliding ring disks of the above-mentioned solutions have the disadvantage that if a boundary stress is exceeded, which corresponds to an average pressure stress of about 30 to 40 bar per segment in the case of usual wedge segment bearings, deformation of the thin-walled arc segment of the sheet-metal ring occurs, so that due to the thin-walled configuration, flattening of the supporting region of the sliding ring disk occurs, which necessarily has a negative effect on the desired "supporting" function of the wedge surface regions.

Whereby the wedge tendency predetermined by means of the "corrugation" then also changes drastically with a further increasing axial load, in such a manner that a plate-spring effect occurs, which then significantly impairs the hydrodynamic supporting ability of the axial sliding bearing, with a complete loss of the lubricant wedge effect.

A transition to the range of mixed friction is connected with this, which then, in connection with the greatly biased corrugated sliding ring disk made of spring steel, can lead to significant wear, and, as a result of this, to total failure of the axial sliding bearing.

In contrast, it was proposed in DE 1 065 671 A to provide the resting run-up surface with radial recesses on the back, so that it only makes contact on individual small feet. By means of this configuration of the contact back, the running surface can be pressed through at the self-supporting locations, by being pressed down by several hundredths of a millimeter. In this way, a wedge-shaped, divided running surface is formed, which builds up a hydrodynamic pressure when the counter-running disk is rotated, and thus guarantees supporting ability. The disadvantage of this solution, however, consists in that the wedge surfaces formed by means of permanent deformation have the same shape for all application cases.

The lubricant gap cannot optimally adapt itself automatically to the stress conditions, in each instance, in order to thereby guarantee optimal supporting ability of the bearing, so that in the case of such axial bearings, severe mixed friction must be expected, which can lead to failure of the bearing during long-term operation.

In DE 1 957 058 A, it is now proposed to deform a planar ring disk consisting of a bearing material, particularly a composite bearing material, on both sides, in saw-like manner, to "dent" it, and subsequently to machine the side intended as the contact back so that it is planar, whereby the wedge surfaces present on the running surface have an inclination of 0.5% to 3%, preferably 1%.

In the case of this solution according to DE 1 957 058 A, as well, the essential disadvantage is, once again, that the inclination of the wedge surface that has been established, in each instance, no longer changes with an increasing axial force, so that the axial sliding bearing is always optimally designed only for one operating state (speed of rotation, stress, etc.). In this connection, these bearings are particularly sensitive to a slightly slanted position of the shaft, because due to unilateral overload of an individual region of the ring disk an edge pressure is provoked, so that in the case of this solution, as well, severe mixed friction must once again be expected, which then can lead to failure of the bearing in long-term operation, particularly in the case of bearings that are used under more difficult operating conditions, such as those that occur in pump construction in the case of water lubrication, for example.

Furthermore, a bearing arrangement for an axial bearing is known from U.S. Pat. No. 3,495,886 A, which bearing is structured as a sheet-metal embossed part, and which once again provides for the use of thin metal sheets, due to the production process, as was also already proposed in connection with the solutions according to DE 1 208 952 A and DE 10 2009 031 760 A1.

Experimental series with such sheet-metal segment bearings composed of thin metal sheets have shown, in this connection, that such sheet-metal segment bearings are very susceptible to vibration, and that when axial vibrations occur, thin-walled sheet-metal segment bearings are destroyed within a very short time.

Whereby the time period during which this destruction occurs often lies below 5 minutes.

However, due to the embossing technology selected in U.S. Pat. No. 3,495,886 A, an increase in the sheet-metal thickness is not possible in the solution according to U.S. Pat. No. 3,495,886 A.

The invention is therefore based on the task of developing an axial sliding bearing having a sliding ring disposed between two planar, ring-shaped sliding surfaces pressure-stressed against one another, which bearing eliminates the aforementioned disadvantages of the state of the art, in this connection is overload-proof, in particular by about 30% to 80% with regard to the average pressure stress of about 30 to 40 bar per wedge segment that is usual in the case of wedge segment bearings, and furthermore, at the same time, is not susceptible to axial vibrations, and, in this connection, can be easily produced in terms of production technology, and easily installed, and furthermore by no means permits the "snap-over effects" that drastically impair the lubricant wedge effect, so that even under more difficult operating conditions, targeted optimal variation of the wedge angle, adapted to the operating conditions, in each instance, is always guaranteed, and great reliability of the axial sliding bearing, at a long useful lifetime, can be guaranteed, while simultaneously expanding the optimal dynamic supporting range.

According to the invention, this task is accomplished by means of an axial sliding bearing having a sliding ring 3 laid into the axial sliding bearing, in accordance with the characteristics of the independent claim of the invention.

Advantageous embodiments, details, and characteristics of the invention are evident from the dependent claims and from the following description of the solution according to the invention, in connection with five representations relating to the solution according to the invention.

In this connection, the representations show, in:

FIG. 1: the axial bearing according to the invention with a sliding ring 3 laid into the bearing surface 2 that is fixed in place on the housing, in a top view;

FIG. 2: the axial bearing according to the invention with a sliding ring in a side view, in section at A-A, according to the representation according to FIG. 1;

FIG. 3: the sliding ring accommodation fixed in place on the housing, with the bearing surface 2 of the axial bearing according to the invention, without the sliding ring 3, in a top view;

FIG. 4: the sliding ring accommodation fixed in place on the housing, of the axial bearing according to the invention, in a side view, in section at B-B, according to the representation according to FIG. 3;

FIG. 5: the sliding ring 3 according to the invention, in a top view.

FIG. 1 shows the axial sliding bearing according to the invention in a top view, having a sliding ring 3 laid into the bearing surface 2 that is fixed in place on the housing, as shown in FIG. 1, between a planar, circular-ring-shaped, pressure-stressed bearing surface 2 that is fixed in place on the housing and provided with one or more lubrication grooves 1, and a planar, circular-ring-shaped, pressure-stressed running surface, not shown in FIG. 1, that is disposed opposite this bearing surface 2 and rotates in the direction of rotation 9 in the operating state of the axial bearing.

In FIG. 2, the axial bearing according to the invention, according to the representation according to FIG. 1, is shown in section at A-A, in a side view, with the sliding ring 3 according to the invention laid into it.

Figure 5:
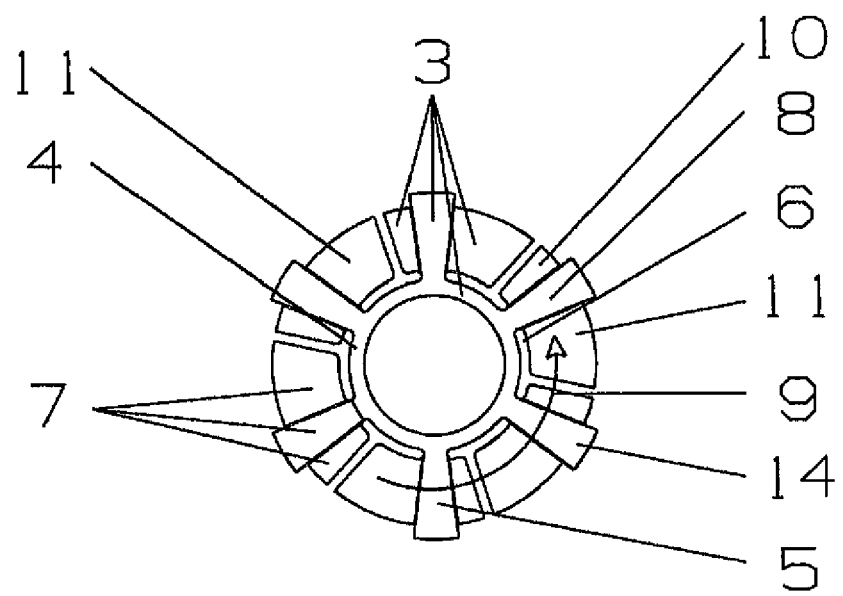

FIG. 5 now shows the sliding ring 3 according to the invention in a top view, which ring is characterized, according to the invention, in that this sliding ring 3 according to the invention is formed by an inner supporting ring 4, on the circumference of which multiple ribs 5 are disposed, uniformly distributed, in radial manner, wherein a radial sliding segment 7 is disposed on each of these ribs 5, at a distance of a ring gap 6 from the supporting ring 4, in each instance.

It is characteristic, in this connection, that each of these sliding segments 7 according to the invention has a planar supporting surface 8 that radially follows the rib 5 and lies directly against the running surface in the run-up state of the bearing.

According to the invention, two slightly inclined (wedge-shaped) angled-away circular ring segment surfaces are disposed on this supporting surface 8, on both sides, in the direction of the bearing surface that is fixed in place on the housing.

It is characteristic for these slightly inclined (wedge-shaped) angled-away circular ring segment surfaces that they form a run-off surface 10 in the direction of rotation 9 of the running surface, on each of the supporting surfaces 8 of the sliding ring 3, and, on the opposite side, i.e. counter to the direction of rotation 9 of the running surface, a carrying surface 11 on each of the supporting surfaces 8 of the sliding ring 3.

It is essential to the invention, in this connection, that the carrying surfaces 11 are configured to be significantly larger than the run-off surface 10.

Figure 2:
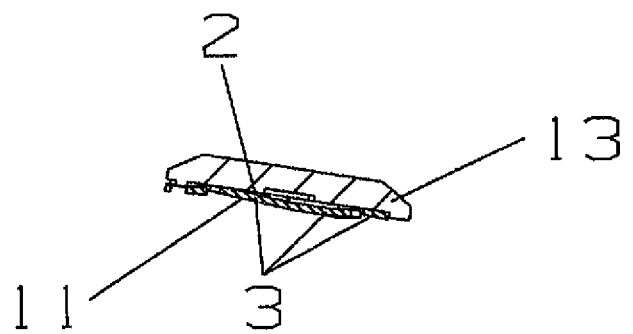
Figure 3:
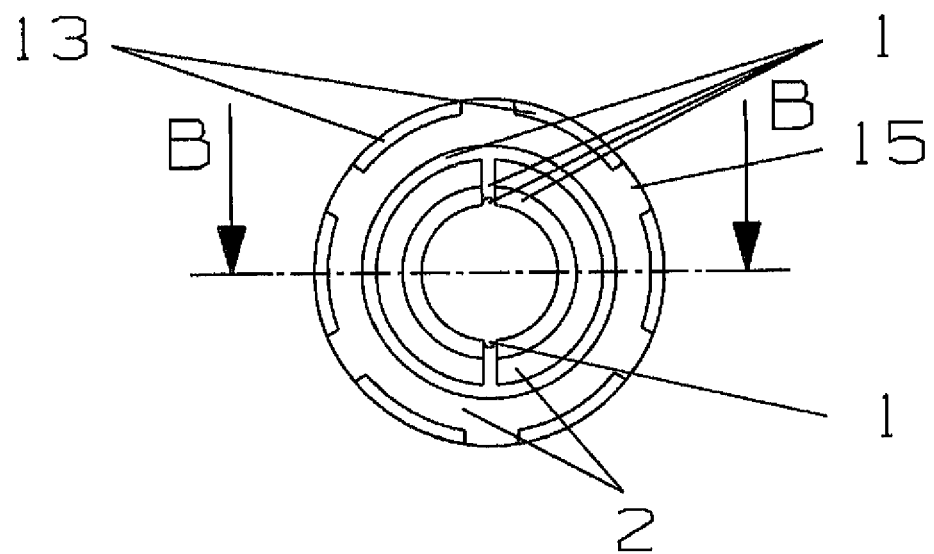
FIG. 3 shows the sliding ring accommodation that is fixed in place on the housing, having the bearing surface 2 of the axial bearing according to the invention, without the sliding ring 3, in a top view.
Figure 4:
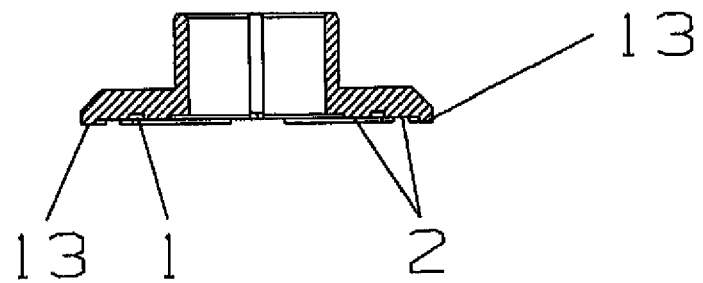
FIG. 4 shows the sliding ring accommodation that is fixed in place on the housing according to the invention, according to FIG. 3, in section at B-B, in a side view.

It is furthermore characteristic that the angled-away, free edges of the carrying surfaces 11, in the run-up state of the bearing, as also shown in FIG. 2, lie on the bearing surface 2 in planar manner, whereby a lubrication gap 12 is always disposed between the sliding segments 7, i.e. between a run-off surface 10 and the carrying surface 11 of the adjacent sliding segment 7, in each instance.

The "engaged" run-off surfaces 10 furthermore stabilize the angled-away carrying surfaces 11 under a load, according to the invention, so that even under more difficult operating conditions, targeted optimal variation of the wedge angle, adapted to the operating conditions, in each instance, is always guaranteed, and great reliability of the axial sliding bearing can always be guaranteed, at a long useful lifetime, while simultaneously clearly expanding the optimal dynamic supporting range.

The solution present here guarantees an optimal solution for the task according to the invention, in this connection, due to the placement of the ring gap 6 according to the invention, in connection with the multi-functional lubrication gaps 12 according to the invention, which uncouple the sliding segments 7 both statically and dynamically, and, at the same time, optimally supply the carrying surfaces 11 with lubricant from the lubrication grooves 1.

In this connection, the lubrication gaps 12 disposed on both sides of each sliding segment 7, in connection with the structure of the sliding ring according to the invention, with a pressure-stressed running surface that lies against the sliding ring 3, simultaneously allow targeted flattening of the lubrication wedge angle at the carrying surface with an increase in the axial force, according to the invention, so that "snap-over" of the sliding segments 7 can be reliably prevented, and the "snap-over effects" that drastically impair the lubrication wedge effect are completely excluded by the solution according to the invention.

As a result of the defined flattening of the lubrication wedge angle(s) at the carrying surfaces brought about, according to the invention, with an increasing axial force, constant expansion of the dynamic supporting range takes place at the same time, according to the invention.

It is advantageous, in this connection, if the carrying surfaces 11 have about 3 times to 5 times the size of the run-off surfaces 10.

However, it is also essential to the invention that the ratio of the outside diameter of the sliding ring 3 in the region of the carrying surfaces 11 to the sheet-metal thickness of the sliding ring 3 is less than/equal to 33 to 1, thereby preventing destruction of the axial bearing.

Within the scope of the experiments conducted in advance of filing the application for this invention, a ratio of the outside diameter of the sliding ring 3 in the region of the carrying surfaces 11 to the sheet-metal thickness of the sliding ring 3 of less than/equal to 33 to 1 was determined for the solution proposed here, which prevents the risk of natural vibrations.

The range of 33:1 to 20:1 for the ratio of the outside diameter of the sliding ring 3 in the region of the carrying surfaces 11 to the sheet-metal thickness of the sliding ring 3 is particularly advantageous.

Even further lowering the above-mentioned ratio to as low as 16:1 does not cause any problems at all technically, in the case of the solution proposed here, and is practical in connection with particularly high specific loads.

Figure 1:
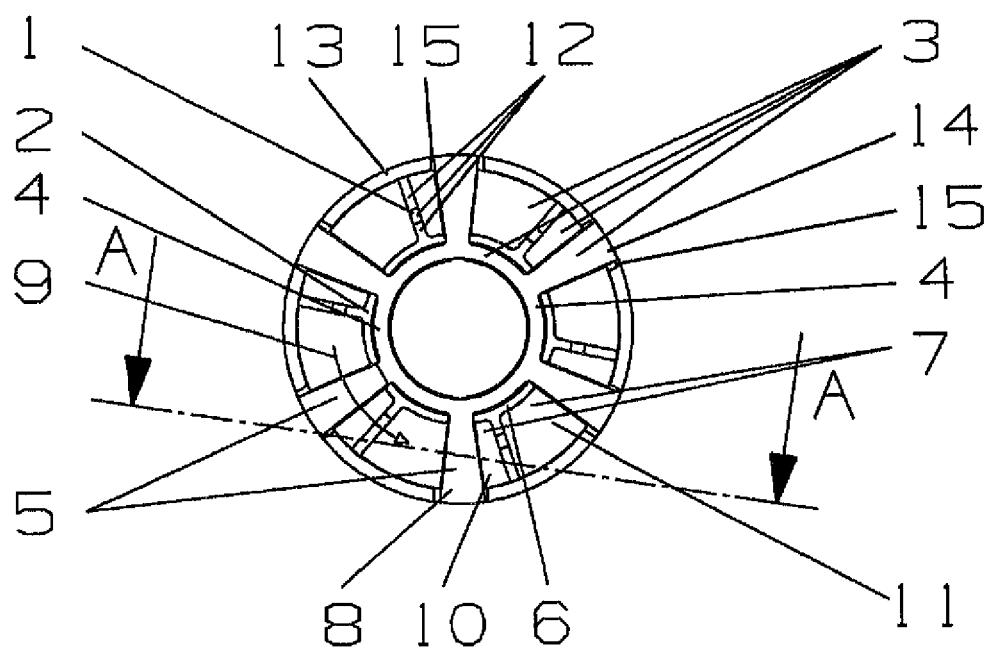

However, it is also essential, as shown in FIGS. 1, 2, and 5, that the size of the carrying surfaces 11 amounts to about 4 times the size of the run-off surfaces 10.

Production of the sliding rings 3 preferably takes place from aluminum sheets, brass sheets or sheets of a bronze alloy.

The carrying surfaces 11, disposed on the sliding ring angled away with regard to the supporting surfaces 8, are inclined by about 0.3% to 5% in the unstressed state, as shown in FIG. 2, for example.

According to the invention, this is achieved, in terms of production technology, during production of the aforementioned sliding rings from the above-mentioned metals/metal alloys, in that the regions of the carrying surfaces 11 that are bent away in pairs, in each instance, after preliminary embossing, as well as those of the run-off surfaces 10, are partially deformed back, in that the completely pre-embossed sliding ring is pressed to be planar, between two plates.

As a result of this, the desired engagement angle of the carrying surface(s) 11, according to the invention, occurs as residual deformation, as a function of the material used, in each instance, and in connection with the thickness of the blank of the sliding ring properly selected for the residual deformation, as a result of the elasticity inherent in the material.

For special application cases, such as axial sliding bearings that use water or cooling water as the lubrication medium, the sliding ring 3 according to the invention can, of course, also be produced by being pre-molded from a temperature-resistant plastic.

It is also in accordance with the invention that a centering collar 13 is disposed on the outer circumference of the bearing surface 2 that is fixed in place on the housing, which collar, in the operating state of the axial bearing, optimally stabilizes the lubrication wedge that forms, so that floating of the running surface in the region of the carrying surfaces 11 of the sliding ring 3 on the lubrication wedges that form according to the invention is already guaranteed in a lower range of the speed of rotation.

It is also in accordance with the invention, in this connection, if, as shown in FIG. 1, all the supporting surfaces 8 project radially beyond these connected run-off surfaces 10 and carrying surfaces 11 by a positioning rib 14, in each instance, and if rest grooves 15 are disposed in the centering collar 13 to accommodate the positioning ribs 14, thereby making it possible to guarantee rotational fixation of the sliding ring 3 in the region of the bearing surface 2 that is fixed in place on the housing.

However, such rotational fixation of the sliding ring 3 is not absolutely necessary.

As a result of the different friction conditions on the two sides of the sliding ring, a self-optimization effect furthermore occurs, according to the invention, which brings about the result that the sliding ring 3 does not move along on/in the bearing surface, or, in the run-up phase, moves along only slightly, rotating in the direction of rotation 9 of the running surface.

REFERENCE SYMBOL LIST

1 lubrication groove
2 bearing surface
3 sliding ring
4 supporting ring
5 rib
6 ring gap
7 sliding segment
8 supporting surface
9 direction of rotation (of the running surface disposed adjacently)
10 run-off surface
11 carrying surface
12 lubrication gap
13 centering collar
14 positioning rib
15 rest grooves

The invention claimed is:

1. An axial sliding bearing having a sliding ring disposed between a planar, circular-ring-shaped, pressure-stressed bearing surface provided with at least one lubrication groove and a planar, circular-ring-shaped, pressure-stressed running surface disposed opposite the bearing surface, wherein
   the sliding ring is formed by an inner supporting ring, on the circumference of which, a plurality of ribs are disposed, uniformly distributed, in radial manner, wherein a radial sliding segment is disposed on each of the ribs, at a distance of a ring gap from the supporting ring, in each instance,
   each of the sliding segments has a planar supporting surface that radially follows the rib and lies planar against the running surface in the run-up state of the bearing, wherein slightly inclined, angled-away circular ring segment surfaces are disposed on both sides of the supporting surface, in the direction of the bearing surface, the slightly inclined, angled-away circular ring segment surfaces comprise a run-off surface disposed on each supporting surface of the sliding ring, in the direction of rotation of the running surface, and, counter to the direction of rotation of the running surface, a carrying surface disposed on each supporting surface of the sliding ring, the carrying surface is significantly larger than the run-off surface, wherein the angled-away, free edge of the carrying surface lies planar on the bearing surface in the axially unstressed state of the bearing, and a lubrication gap is disposed between the sliding segments, i.e. between each run-off surface and each carrying surface, in each instance, and the ratio of the outside diameter of the sliding ring in the region of the carrying surfaces to the sheet-metal thickness of the sliding ring is less than or equal to 33 to 1.

2. The axial sliding bearing according to claim 1, wherein the carrying surfaces have about 3 times to 5 times the size of the run-off surfaces.

3. The axial sliding bearing according to claim 1, wherein in the unstressed sliding ring, the carrying surfaces are angled away inclined by about 0.3% to 5% relative to the supporting surfaces.

4. The axial sliding bearing according to claim 1, wherein a centering collar is disposed on the outside circumference of the bearing surface that is fixed in place on the housing.

5. The axial sliding bearing according to claim 4, wherein rest grooves are disposed in the centering collar, to accommodate the positioning ribs.

6. The axial sliding bearing according to claim 1, wherein at least a plurality of all the supporting surfaces project radially beyond the run-off surfaces and carrying surfaces connected with them, in each instance, by a positioning rib, in each instance.

\* \* \* \* \*

UNITED STATES PATENT AND TRADEMARK OFFICE
CERTIFICATE OF CORRECTION

| | |
|---|---|
| PATENT NO. | : 9,188,157 B2 |
| APPLICATION NO. | : 14/366905 |
| DATED | : November 17, 2015 |
| INVENTOR(S) | : Blechschmidt et al. |

Page 1 of 1

It is certified that error appears in the above-identified patent and that said Letters Patent is hereby corrected as shown below:

On the title page, Item [71], please correct the Applicant information to correctly read as follows:

-- NIDEC GPM GmbH, Auengrund OT Merbelsrod (DE) --.

Signed and Sealed this
First Day of March, 2016

Michelle K. Lee
*Director of the United States Patent and Trademark Office*